United States Patent
Pan

(10) Patent No.: US 8,121,405 B2
(45) Date of Patent: Feb. 21, 2012

(54) SYSTEMS AND METHODS FOR SKIN-COLOR-COGNIZANT COLOR MAPPING

(75) Inventor: Hao Pan, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1117 days.

(21) Appl. No.: 11/948,988

(22) Filed: Nov. 30, 2007

(65) Prior Publication Data

US 2009/0141971 A1 Jun. 4, 2009

(51) Int. Cl.
*G06K 9/00* (2006.01)
*G09G 5/02* (2006.01)
*G03F 3/08* (2006.01)

(52) U.S. Cl. .......................... 382/167; 345/590; 358/518

(58) Field of Classification Search .................. 382/162, 382/167; 345/590; 358/519, 518
See application file for complete search history.

(56) References Cited

U.S. PATENT DOCUMENTS

| | | | |
|---|---|---|---|
| 2004/0021672 A1* | 2/2004 | Wada | 345/591 |
| 2004/0208363 A1 | 10/2004 | Berge et al. | |
| 2005/0117798 A1 | 6/2005 | Patton et al. | |
| 2005/0122294 A1* | 6/2005 | Ben-David et al. | 345/87 |
| 2005/0195212 A1 | 9/2005 | Kurumisawa | |
| 2005/0232482 A1 | 10/2005 | Ikeda et al. | |
| 2005/0244053 A1 | 11/2005 | Hayaishi | |
| 2006/0119870 A1* | 6/2006 | Ho et al. | 358/1.9 |
| 2006/0170938 A1* | 8/2006 | Ibarluzea et al. | 358/1.9 |
| 2007/0046690 A1* | 3/2007 | Madden et al. | 345/590 |
| 2007/0081177 A1* | 4/2007 | Um et al. | 358/1.9 |
| 2008/0043260 A1* | 2/2008 | Ramanath et al. | 358/1.9 |

FOREIGN PATENT DOCUMENTS

WO    WO 02099557    12/2002

OTHER PUBLICATIONS

Amidror ("Scattered data interpolation methods for electronic imaging system—a survey," J. of Electronic Imaging 11(2), Apr. 2002, pp. 157-176)—discloses representing internal points as a combination of control points [Sect. 2.2].*

Ha et al. ("A New Approach to Color Adjustment for Mobile Application Displays with a Skin Protection Algorithm on a CIE1931 Diagram," IEEE Transaction on Consumer Electronics, vol. 53, Issue 1, Feb. 2007, pp. 191-196).*

* cited by examiner

*Primary Examiner* — Yubin Hung
(74) *Attorney, Agent, or Firm* — Krieger Intellectual Property, Inc.; Scott C. Krieger

(57) ABSTRACT

Embodiments of the present invention comprise systems and methods for adjusting image color values to accommodate a different color gamut. In some embodiments, colors within a skin-color region are preserved while colors outside the skin-color region are stretched to fill the new color gamut.

18 Claims, 5 Drawing Sheets

SYSTEMS AND METHODS FOR SKIN-COLOR-COGNIZANT COLOR MAPPING

FIELD OF THE INVENTION

Embodiments of the present invention comprise methods and systems for color gamut conversion. Some embodiments maintain skin colors during color gamut conversion.

BACKGROUND

The standard sRGB color gamut is widely used in display devices and current HDTV and Internet/computer standards. Details of the sRGB standard are known in the art and may be obtained through reference to: M. Anderson, R. Motta, S. Chandrasekar, M. Stokes; "Proposal for a Standard Default Color Space for the Internet—sRGB," in *The Fourth Color Imaging Conference Color Science, Systems and Applications,* 238-246, or to Wikipedia at [http://en.wikipedia.org/wiki/SRGB_color_space]; which are hereby incorporated herein by reference. Currently, advances in flat panel display (FPD) technology give displays the ability to display a color gamut wider than the sRGB color gamut. However, if the sRGB-coded source content is used directly to drive a wide color gamut (WCG) display without color gamut mapping and processing, the mismatch between the WCG display and the sRGB-coded source content makes the color of human skin appear unnatural on the WCG display.

Skin color is commonly recognized in the display industry as one of the important memory colors sensitive to human eyes, so rendering natural skin color on a WCG display is important. Since sRGB as the HDTV and Internet/computer standard will not likely change in the foreseeable future, it would be advantageous to have a method for converting content from sRGB to a wider color gamut without compromising skin color quality.

SUMMARY

Some embodiments of the present invention comprise systems and methods for color-space-region-specific mapping of colors from one color gamut to another. In some embodiments, regions of a color space may be designated as skin-color regions and those skin-color regions may be mapped differently than other regions of the color space. Some embodiments comprise a skin-color-cognizant color gamut mapping algorithm (GMA) that intelligently maps sRGB colors to the WCG colors in order to both fully utilize the wide color gamut of a WCG display and faithfully render skin colors with a natural appearance.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
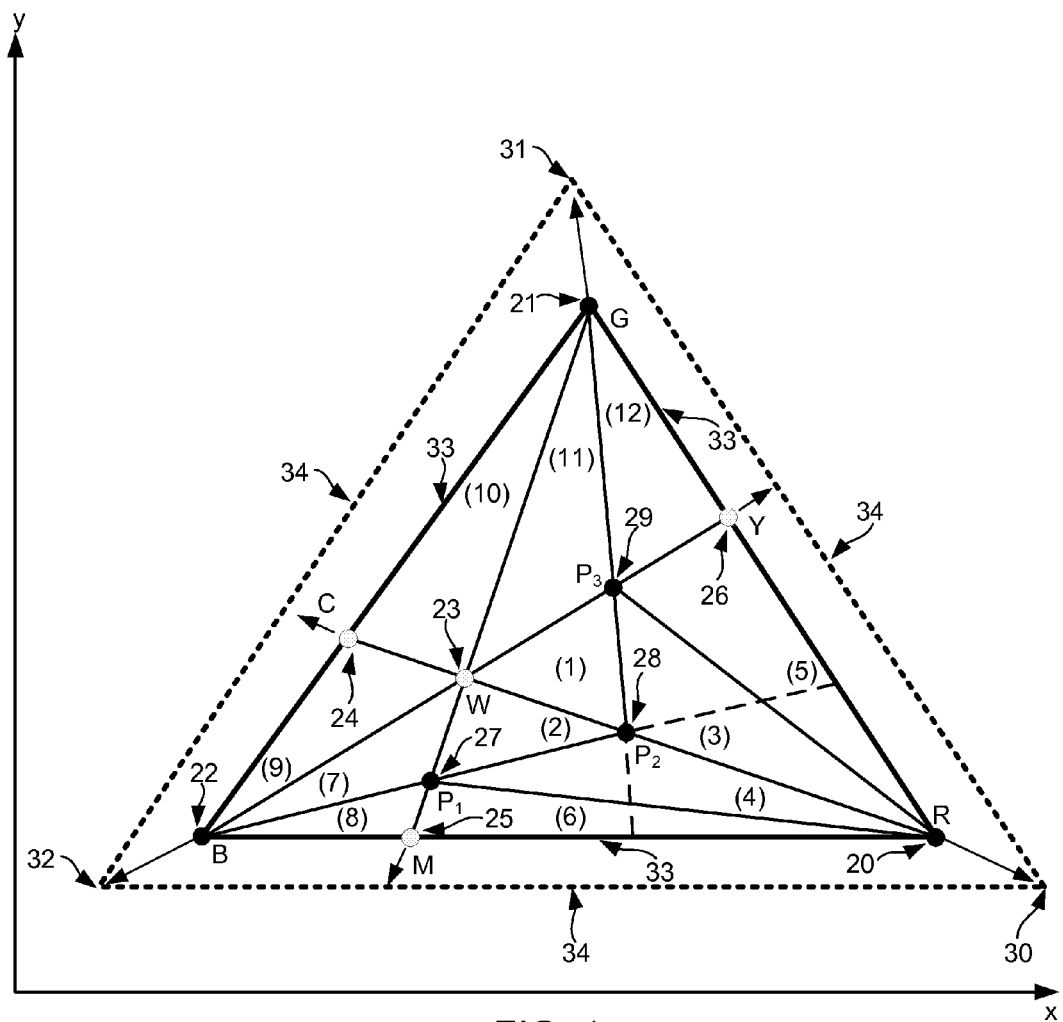
FIG. 1 is a diagram showing exemplary RGB color gamuts and associated regions in xy chromaticity space.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

In some embodiments of the present invention, a color gamut mapping algorithm (GMA) may map RGB values or a color in a color gamut to new RGB values in a new color gamut. The RGB values of a color before and after a GMA may or may not be different, and may or may not represent the same physical color that is characterized by CIE XYZ color scales. A definition of the CIE XYZ color space may be obtained from Wikipedia at [http://en.wikipedia.org/wiki/CIE_1931_color_space], which is incorporated herein by reference.

When the input of a GMA is 3 dimensional (RGB) and output is 3 dimensional (RGB), the GMA can be characterized as a 3-D mapping problem. This is the case in some embodiments of the present invention.

Some embodiments of the present invention comprise a skin-cognizant wide color gamut (WCG) GMA, which is a special GMA with the following four goals:
 1. faithfully rendering skin colors,
 2. utilizing the expanded color gamut,
 3. avoiding contouring or other artifacts, and
 4. maintaining simplicity and flexibility.

To fulfill the above goals, some embodiments comprising a skin-cognizant GMA may decompose the input color gamut into skin regions and non-skin regions. During implementation of the GMA, the skin regions are not substantially stretched and may retain the same physical colors (e.g., same CIE XYZ color scales) in the new color gamut; while the non-skin regions may be stretched to utilize the expanded color gamut.

In some embodiments of the present invention, the algorithm is a region-wise linear operation in the RGB domain.

In some embodiments, the input sRGB color gamut is decomposed into 12 regions by choosing 10 control points in the color gamut in the xy-chromaticity chart.

In some embodiments, each region may be determined by three control points. Totally there are 10 control points. Six control points are on the boundary of the color gamut, and four are inside the color gamut.

In some embodiments, two regions may be designated as skin-color regions, and 10 regions may be designated as non-skin-color regions.

In some embodiments, a color may be represented as the weighted sum of three control point colors. Therefore, a color can be represented by three control points and three corresponding weights, which may be called a weighting vector.

In some exemplary embodiments, a color in the sRGB gamut may be mapped to a color in the WCG gamut by assigning new RGB values to its three control points and keeping its three weights.

The new RGB values of the control points that determine the skin region(s) may retain the same physical colors (same CIE XYZ color scales) in the new WCG color gamut, Exemplary Embodiments Typically, a color C on a display is represented by values $[R_c, G_c, B_c]^T$, where $0 \leq R_c, G_c, B_c \leq 1$. The same color C can also be represented by the sum of three weighted arbitrary colors, $$C = cp_1 CP_1 + cp_2 CP_2 + cp_3 CP_3$$

The three arbitrary colors are named as $CP_1$, $CP_2$, and $CP_3$.

If the RGB values of $CP_1$, $CP_2$, and $CP_3$ are $[R_{CP1}, G_{CP1}, B_{CP1}]^T$, $[R_{CP2}, G_{CP2}, B_{CP2}]^T$, $[R_{CP3}, G_{CP3}, B_{CP3}]^T$, respectively, then the relationship between $[R_c, G_c, B_c]^T$ and $[cp_1, cp_2, cp_3]^T$ is $$\begin{bmatrix} R_c \\ G_c \\ B_c \end{bmatrix} = \begin{bmatrix} R_{CP1} & R_{CP2} & R_{CP3} \\ G_{CP1} & G_{CP2} & G_{CP3} \\ B_{CP1} & B_{CP2} & B_{CP3} \end{bmatrix} \begin{bmatrix} cp_1 \\ cp_2 \\ cp_3 \end{bmatrix} \quad (1)$$

or $$\begin{bmatrix} cp_1 \\ cp_2 \\ cp_3 \end{bmatrix} = \begin{bmatrix} R_{CP1} & R_{CP2} & R_{CP3} \\ G_{CP1} & G_{CP2} & G_{CP3} \\ B_{CP1} & B_{CP2} & B_{CP3} \end{bmatrix}^{-1} \begin{bmatrix} R_c \\ G_c \\ B_c \end{bmatrix} \quad (2)$$

Once $CP_1$, $CP_2$, and $CP_3$ are fixed, $[cp_1, cp_2, cp_3]^T$ is uniquely defined. If $0 \leq p_1, p_2, p_3 \leq 1$, then the color C is inside the triangle formed by $CP_1$, $CP_2$, and $CP_3$ in the xy-chromaticity chart; if not, C is outside the triangle.

The algorithm of these embodiments is based on Equations (1) and (2). Specifically, the input color gamut is decomposed into multiple regions by choosing multiple $CP_1$, $CP_2$, and $CP_3$ for each region. These colors are called control points. The colors in a region are represented by a weighted sum of the three control points of the region which can be obtained by Equation (2). In the 2-D xy-chromaticity chart, the entire color gamut defined by three RGB primaries is a triangle, and the regions defined by three control points are sub-triangles inside the RGB triangle.

In the skin-cognizant algorithm of some embodiments, control points may first be converted to the wide color gamut by assigning new RGB values. Colors within the area defined by the control points may then be converted to the wide color gamut by using Equation (1) to calculate their new RGB values. In some embodiments, the colors in a region are represented by a weighted sum of the region's control points. In some embodiments, the regions are triangular and the control points may represent the vertices of the triangular region. In these embodiments, if the physical colors of the three control points of a region are preserved, because the weights of all the colors do not change, then the physical colors within the region that are calculated by Equation (1) will be preserved.

In skin-cognizant algorithm embodiments, assignment of appropriate RGB values to the control points can affect performance and efficiency. Assignment of appropriate control points provides the ability to stretch colors in some regions while preserving colors in other regions.

(1) Decomposition of the Input Color Gamut

Exemplary embodiments of the present invention comprise decomposition of the input color gamut. In some embodiments, the algorithm may find the control points for the skin-color regions. In some embodiments, skin colors may be found in the W-M-R and W-Y-R sub-triangles, and close the white point W, as shown in FIG. 1. In these embodiments, three control points ($P_1$, $P_2$, and $P_3$) and the white point (W) in the W-M-R and W-Y-R sub-triangles may be used to define two skin-color triangles 1 and 2. Ideally, in these embodiments, $P_1$, $P_2$, and $P_3$ should be placed at optimal positions defined herein.

To simplify the calculation, $P_1$, $P_2$, and $P_3$ may be placed in a highly correlated fashion. Specifically, $P_1$ may be set on the G-M line, at a location that satisfies $$\begin{cases} R = B \\ G = k_1 R \end{cases}$$

$P_3$ is on the B-Y line, at a location that satisfies $$\begin{cases} R = G \\ B = k_3 R \end{cases}$$

and $P_2$ is on the R-W line, at a location that satisfies $$\begin{cases} G = B \\ G = k_2 R \end{cases}$$

In some embodiments, $P_2$ may also be on the B-$P_1$ and G-$P_3$ lines. To satisfy all these conditions, $k_1 = k_2 = k_3 = k$, where k controls the position that $P_2$ is between W and R. When k is 0, $P_2$ is positioned at R; When k is 1, $P_2$ is positioned at W. Therefore, the three-element vectors of $P_1$, $P_2$ and $P_3$ can be represented by the RGB primaries as $$\begin{bmatrix} 1 \\ k \\ 1 \end{bmatrix}, \begin{bmatrix} 1 \\ k \\ k \end{bmatrix}, \begin{bmatrix} 1 \\ 1 \\ k \end{bmatrix},$$

respectively.

The two skin color triangles are the W-$P_2$-$P_3$ and W-$P_1$-$P_2$ triangles 1 and 2, which are illustrated in FIG. 1.

In some exemplary embodiments of the present invention, illustrated in FIG. 1, 12 regions are designated in the xy-chromaticity chart. Each region 1-12 is in the form of a triangle in the xy-chromaticity chart. These embodiments comprise 10 control points 20-29. The RGB solid-line triangle 33, with vertices R 20, G 21 and B 22, is the current color gamut; the bigger dashed-line triangle 34 is the new wide color gamut, with vertices at 30, 31 and 32. The skin-cognizant GMA in these embodiments moves the points R 20, G 21, B 22, Y 26, M 25, and C 24 to the boundary 34 of the new wide color gamut, but preserves the positions of W 23, $P_1$ 27, $P_2$ 28 and $P_3$ 29 in the xy-chromaticity chart. Accordingly, the skin-cognizant GMA of these embodiments preserves the RGB values of R 20, G 21, B 22, Y 26, M 25, and C 24, but changes RGB values of W 23, $P_1$ 27, $P_2$ 28 and $P_3$ 29.

In some embodiments, the algorithm may decompose the rest of the regions after skin-color triangles or regions are defined. The algorithm may use the following colors, R, G, B, Y, M, C and W 20-26, as additional control points. Their RGB values may be expressed as:

$$\begin{bmatrix} R \\ G \\ B \end{bmatrix} \begin{bmatrix} 1 \\ 0 \\ 0 \end{bmatrix}, \begin{bmatrix} 0 \\ 1 \\ 0 \end{bmatrix}, \begin{bmatrix} 0 \\ 0 \\ 1 \end{bmatrix}, \begin{bmatrix} 1 \\ 1 \\ 0 \end{bmatrix}, \begin{bmatrix} 1 \\ 0 \\ 1 \end{bmatrix}, \begin{bmatrix} 0 \\ 1 \\ 1 \end{bmatrix}$$

As illustrated in FIG. 1, the total 10 control points 20-29 ($P_1$, $P_2$, $P_3$, R, G, B, Y, M, C, W) divide the RGB triangle into 12 sub-triangles 1-12 in the xy-chromaticity chart. Regions 1 and 2 may be designated as skin-color regions, and regions 3-12 may be designated as non-skin color regions.

(2) Calculating New RGB Values for Every Color

Some embodiments may assign new RGB values to the 10 control points, which essentially change the 3×3 matrix in Equation (1) for every region. Then, based on Equation (1), new RGB values may be calculated for other colors.

Preserving skin colors in the expanded color gamut requires that physical colors of regions 1 and 2, defined by XYZ, should be the same after and before the GMA. If the physical colors of the three control points of a region are preserved, Equation (1) guarantees that all the colors in the region are also preserved. Therefore, in order to preserve regions 1 and 2, we need to make the control points $P_1$, $P_2$ and $P_3$ 27-29 and W 23 have the same XYZ values before and after the GMA.

To fully take advantage of the wide color gamut, the new RGB values of R, G, B, Y, M, C 20-22, 24-26 should make these control points on the boundary of the wide color gamut triangle 34 in the y chromaticity chart. In an exemplary embodiment, using the old RGB values of R, G, B, Y, M, C, 20-22, 24-26 which are, respectively:

$$\begin{bmatrix} R \\ G \\ B \end{bmatrix} \begin{bmatrix} 1 \\ 0 \\ 0 \end{bmatrix}, \begin{bmatrix} 0 \\ 1 \\ 0 \end{bmatrix}, \begin{bmatrix} 0 \\ 0 \\ 1 \end{bmatrix}, \begin{bmatrix} 1 \\ 1 \\ 0 \end{bmatrix}, \begin{bmatrix} 1 \\ 0 \\ 1 \end{bmatrix}, \begin{bmatrix} 0 \\ 1 \\ 1 \end{bmatrix},$$

in relation to the WCG will result in these control points being located on the boundary 34 of the wide color gamut triangle in the xy chromaticity chart.

Figure 2:
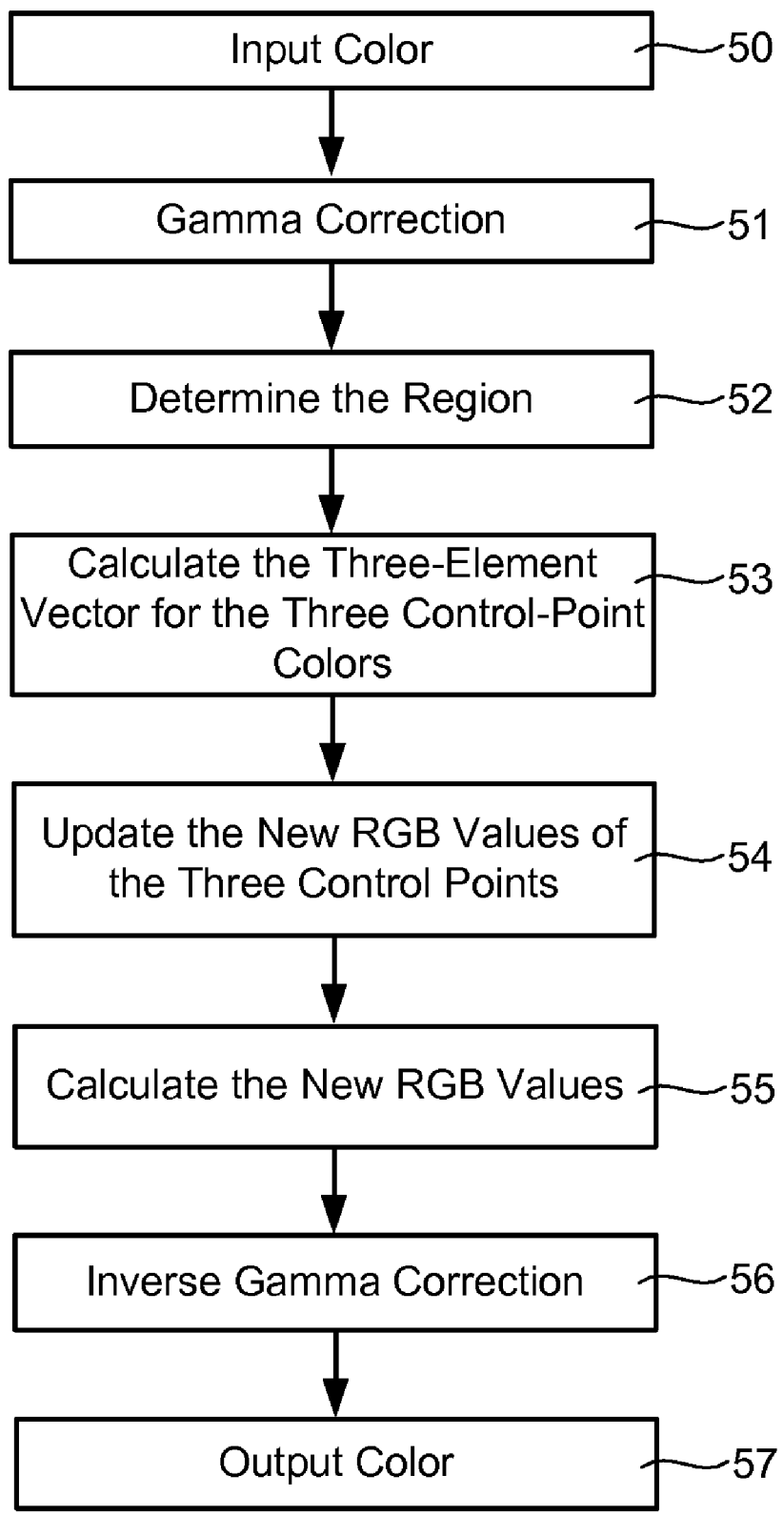
FIG. 2 is a diagram showing an exemplary method comprising calculation of a weighting vector relative to control points.

Some embodiments of the present invention may be described with reference to FIG. 2. In these embodiments, gamma correction 51 may be performed. Since these embodiments operate in the linear domain, gamma correction and inverse gamma correction may be used.

In the next step of these embodiments, the region of the input color is determined 52. In some embodiments, the expressions in Table 1 may be used to determine the region of an input color.

TABLE 1

Determination of a region for an RGB color.

| 1 | 2 | 3 | 4 | 5 | 6 |
|---|---|---|---|---|---|
| R > G > B<br>R < B/k | R ≥ B ≥ G<br>R < G/k | R > G > B<br>R ≥ B/k<br>G < B/k | R ≥ B ≥ G<br>R ≥ G/k<br>B < G/k | R > G > B<br>R ≥ B/k<br>G ≥ B/k | R ≥ B ≥ G<br>R ≥ G/k<br>B ≥ G/k |
| 7 | 8 | 9 | 10 | 11 | 12 |
| B ≥ R ≥ G<br>R < G/k | B ≥ R ≥ G<br>R ≥ G/k | B ≥ G > R | G ≥ B > R | G ≥ R > B<br>R < B/k | G ≥ R > B<br>R ≥ B/k |

Based on the region assigned to the input color, a three-element vector may be determined 53. The three control points of the region may be used along with one of the 12 equations to calculate the three-element vector.

Region 1:

The three control points are $P_2$, $P_3$, and W, and the corresponding three-element vector $[p_2\ p_3\ w]^T$ may be determined by the following equations $$p_2 P_2 + p_3 P_3 + wW = \begin{bmatrix} R \\ G \\ B \end{bmatrix} \Rightarrow \begin{cases} p_2 + p_3 + w = R \\ kp_2 + p_3 + w = G \\ kp_2 + kp_3 + w = B \end{cases}$$

The solution is $$\begin{cases} p_2 = \frac{1}{1-k}(R-G) \\ p_3 = \frac{1}{1-k}(G-B) \\ w = R - \frac{1}{1-k}(R-B) \end{cases}$$

Region 2:

The three control points are $P_1$, $P_2$, and W, and the corresponding three-element vector $[p_1\ p_2\ w]^T$ may be determined by the following equations $$p_1 P_1 + p_2 P_2 + wW = \begin{bmatrix} R \\ G \\ B \end{bmatrix} \Rightarrow \begin{cases} p_1 + p_2 + w = R \\ w + kp_1 + kp_2 = G \\ w + p_1 + kp_2 = B \end{cases}$$

$$\begin{cases} p_1 = \frac{1}{1-k}(B-G) \\ p_2 = \frac{1}{1-k}(R-B) \\ w = R - \frac{1}{1-k}(R-G) \end{cases}$$

Region 3

The three control points are $P_2$, $P_3$, and R, and the corresponding three-element vector $[p_2\ p_3\ r]^T$ may be determined by the following equations $$p_2 P_2 + p_3 P_3 + rR = \begin{bmatrix} R \\ G \\ B \end{bmatrix} \Rightarrow \begin{cases} p_2 + p_3 + r = R \\ kp_2 + p_3 = G \\ kp_2 + kp_3 = B \end{cases}$$

$$\begin{cases} p_2 = \frac{1}{k}B - \frac{1}{1-k}(G-B) \\ p_3 = \frac{1}{1-k}(G-B) \\ r = R - \frac{1}{k}B \end{cases}$$

Region 4

The three control points are $P_1$, $P_2$, and R, and the corresponding three-element vector $[p_1\ p_2\ r]^T$ may be determined by the following equations $$p_1 P_1 + p_2 P_2 + rR = \begin{bmatrix} R \\ G \\ B \end{bmatrix} \Rightarrow \begin{cases} p_1 + p_2 + r = R \\ kp_1 + kp_2 = G \\ p_1 + kp_2 = B \end{cases}$$

$$\begin{cases} p_1 = \frac{1}{1-k}(B-G) \\ p_2 = \frac{1}{k}G - \frac{1}{1-k}(B-G) \\ r = R - \frac{1}{k}G \end{cases}$$

Region 5

The three control points are $P_3$, Y, and R, and the corresponding three-element vector $[p_3\ y\ r]^T$ may be determined by the following equations $$p_3 P_3 + yY + rR = \begin{bmatrix} R \\ G \\ B \end{bmatrix} \Rightarrow \begin{cases} p_3 + y + r = R \\ p_3 + y = G \\ kp_3 = B \end{cases}$$

$$\begin{cases} p_3 = \frac{1}{k}B \\ y = G - \frac{1}{k}B \\ r = R - G \end{cases}$$

Region 6

The three control points are $P_1$, M, and R, and the corresponding three-element vector $[p_1\ m\ r]^T$ may be determined by the following equations $$p_1 P_1 + mM + rR = \begin{bmatrix} R \\ G \\ B \end{bmatrix} \Rightarrow \begin{cases} p_1 + m + r = R \\ kp_1 = G \\ p_1 + m = B \end{cases}$$

-continued $$\begin{cases} p_1 = \frac{1}{k}G \\ m = B - \frac{1}{k}G \\ r = R - B \end{cases}$$

Region 7

The three control points are $P_1$, B, and W, and the corresponding three-element vector $[p_1\ b\ w]^T$ may be determined by the following equations $$p_1 P_1 + bB + wW = \begin{bmatrix} R \\ G \\ B \end{bmatrix} \Rightarrow \begin{cases} p_1 + w = R \\ kp_1 + w = G \\ p_1 + b + w = B \end{cases}$$

$$\begin{cases} p_1 = \frac{1}{k}(R-G) \\ w = R - \frac{1}{1-k}(R-G) \\ b = B - R \end{cases}$$

Region 8

The three control points are $P_1$, M, and B, and the corresponding three-element vector $[p_1\ m\ b]$ may be determined by the following equations $$p_1 P_1 + mM + bB = \begin{bmatrix} R \\ G \\ B \end{bmatrix} \Rightarrow \begin{cases} p_1 + m = R \\ kp_1 = G \\ p_1 + m + b = B \end{cases}$$

$$\begin{cases} p_1 = \frac{1}{k}G \\ m = R - \frac{1}{k}G \\ b = B - R \end{cases}$$

Region 9

The three control points are C, B, and W, and the corresponding three-element vector $[c\ b\ w]^T$ may be determined by the following equations $$cC + bB + wW = \begin{bmatrix} R \\ G \\ B \end{bmatrix} \Rightarrow \begin{cases} w = R \\ w + c = G \\ w + c + b = B \end{cases}$$

$$\begin{cases} w = R \\ c = G - R \\ b = B - G \end{cases}$$

Region 10

The three control points are C, G, and W, and the corresponding three-element vector $[c\ g\ w]^T$ may be determined by the following equations $$cC + gG + wW = \begin{bmatrix} R \\ G \\ B \end{bmatrix} \Rightarrow \begin{cases} w = R \\ w + c + g = G \\ w + c = B \end{cases}$$

$$\begin{cases} w = R \\ c = B - R \\ g = G - B \end{cases}$$

Region 11

The three control points are $P_3$, G, and W, and the corresponding three-element vector $[p_3\ g\ w]^T$ may be determined by the following equations $$p_3 P_3 + gG + wW = \begin{bmatrix} R \\ G \\ B \end{bmatrix} \Rightarrow \begin{cases} p_3 + w = R \\ p_3 + w + g = G \\ kp_3 + w = B \end{cases}$$

$$\begin{cases} p_3 = \frac{1}{1-k}(R - B) \\ w = R - \frac{1}{1-k}(R - B) \\ g = G - R \end{cases}$$

Region 12

The three control points are $P_3$, G, and Y, and the corresponding three-element vector $[p_3\ g\ y]^T$ may be determined by the following equations $$p_3 P_3 + gG + yY = \begin{bmatrix} R \\ G \\ B \end{bmatrix} \Rightarrow \begin{cases} p_3 + y = R \\ p_3 + g + y = G \\ kp_3 = B \end{cases}$$

$$\begin{cases} p_3 = \frac{1}{k}B \\ y = G - \frac{1}{k}B \\ g = G - R \end{cases}$$

Once a three-element vector is determined 53, the new RGB values of the control points may be updated 54 to values that correspond to the new expanded color gamut. A new RGB value may then be calculated for the input color 55. This new RGB value may be calculated by Equation (1) with the new RGB values of three control points and the three-element vector. The new expanded color gamut RGB color values may then be inverse gamma corrected to convert to the code value domain.

Figure 3:
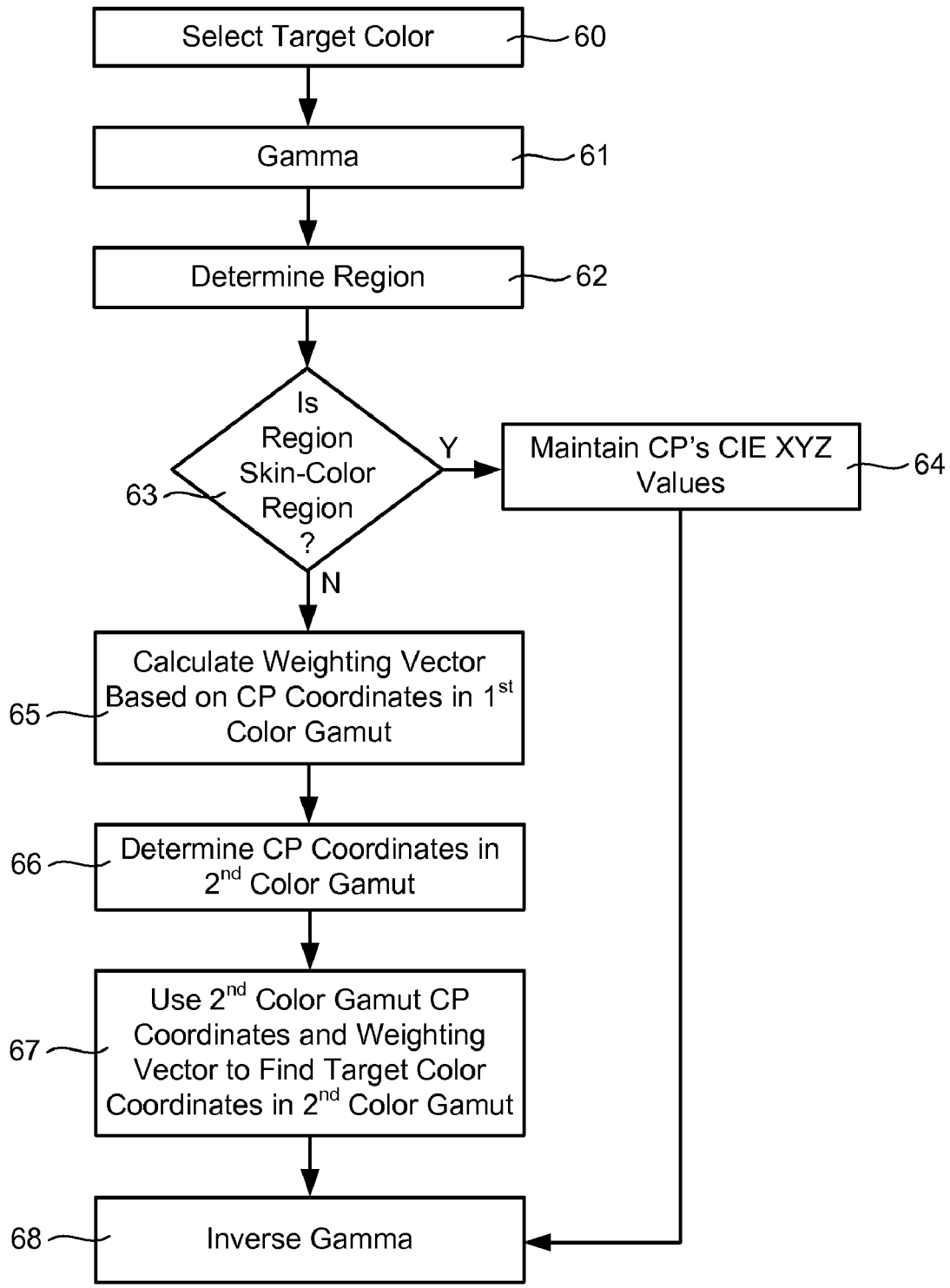
FIG. 3 is a diagram showing an exemplary method comprising optional calculation of weighting vectors for non-skin-tone regions.

Some embodiments of the present invention may be described with reference to FIG. 3. In these embodiments, a target color is selected 60 and gamma correction may be performed 61. The predetermined color gamut region in which the target color resides may then be determined 62. If the target color is located within a skin-color region 63, the target color's CIE XYZ values may be maintained 64. However, if the target color is located within a non-skin-color region, the target color's CIE XYZ values may be changed with further processing. A weighting vector may be calculated 65 based on the coordinates of the control points that define the color gamut region and the target color coordinates.

The control points of the region may then be stretched to different color gamut whereby one or more of the control points may be moved to new coordinates 66. In an exemplary embodiment, control points along the color gamut boundary will be relocated to a new, wider color gamut boundary, e.g., sRGB to WCG. Once the new control point coordinates are found, they may be used along with the weighting vector to calculate 67 new coordinates in the new, wider color gamut for the target color. The new coordinates may then be inverse gamma corrected 68 to return to the code value domain. Colors which were found to reside in a skin-color region and whose CIE XYZ values were maintained 64 may also be inverse gamma corrected 68.

Figure 4:
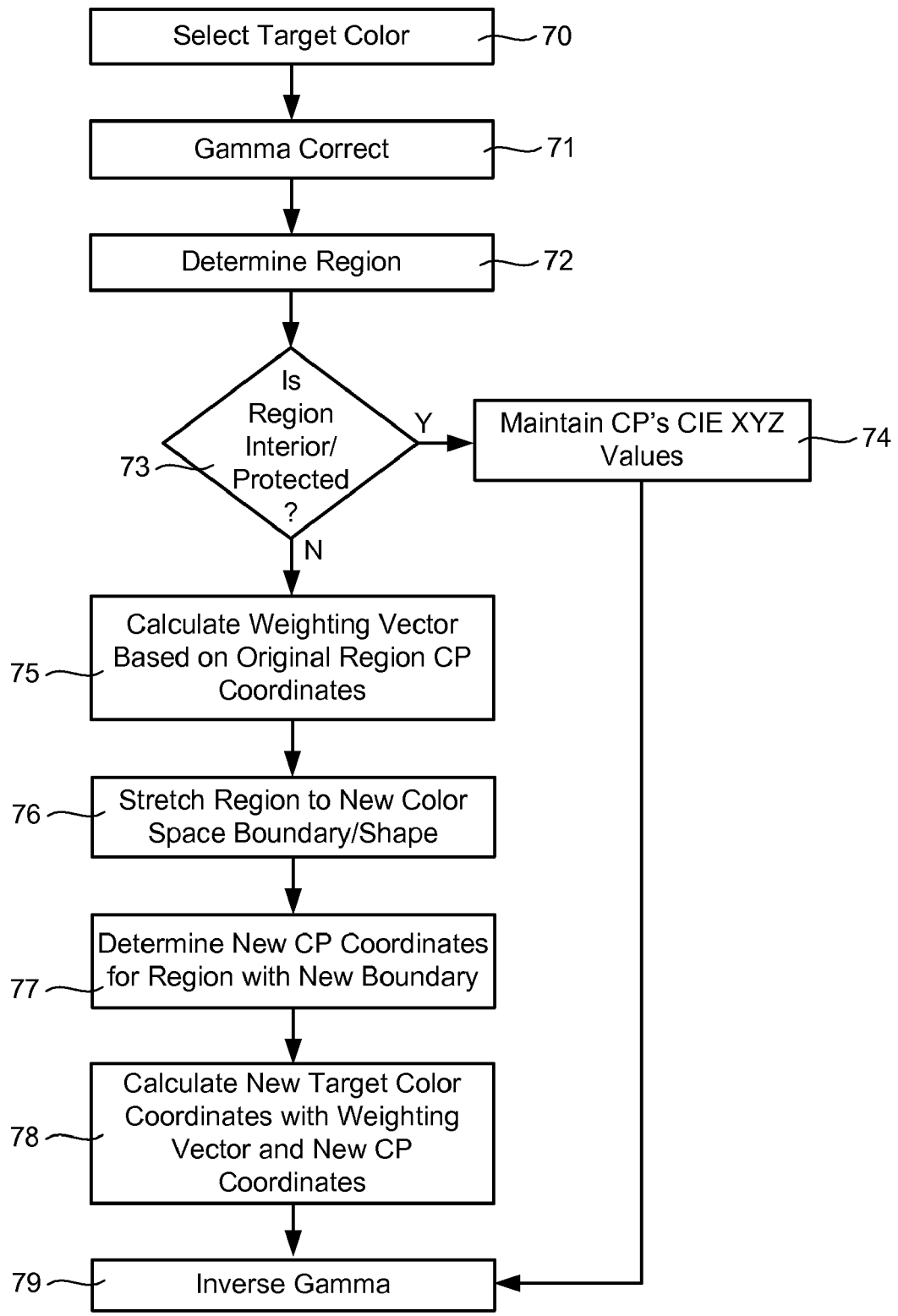
FIG. 4 is a diagram showing an exemplary method comprising optional calculation of weighting vectors for non-protected regions.

Some embodiments of the present invention may be described with reference to FIG. 4. In these embodiments, a target color may be selected 70. The target color may be gamma corrected 71 and the corrected coordinates may be used to locate the target color in a region 72 of a color gamut. The color gamut may be divided into regions with varying modification parameters. Some regions may be modifiable while others are protected with limitations on their modification. In some embodiments, interior regions in a color gamut, such as regions that do not comprise points on the color gamut boundary, may have modification limitations. In some embodiments, these regions may be restricted to maintain their size, aspect ratio, coordinates or other geometric or non-geometric characteristics.

If a target color is found 73 to reside within a protected region, the color's CIE XYZ values may be maintained 74. If the target color is found 73 to reside within a region that allows or requires region modification, a weighting vector 75 may be calculated based on the target color's original coordinates and the control point coordinates of the region in which the color is located. The region may then be modified 76 wherein the control points for the region may obtain new, different coordinates 77. This may occur through stretching the region to a new color gamut with a boundary that is different from the boundary of the original color gamut. Using the new region control point coordinates and the weighting vector new target color coordinates may be calculated 78 in the new color gamut. These new coordinates may then be inverse gamma corrected 79 to return to the code value domain. Coordinates for colors that reside in protected regions may also be inverse gamma corrected 79.

Figure 5:
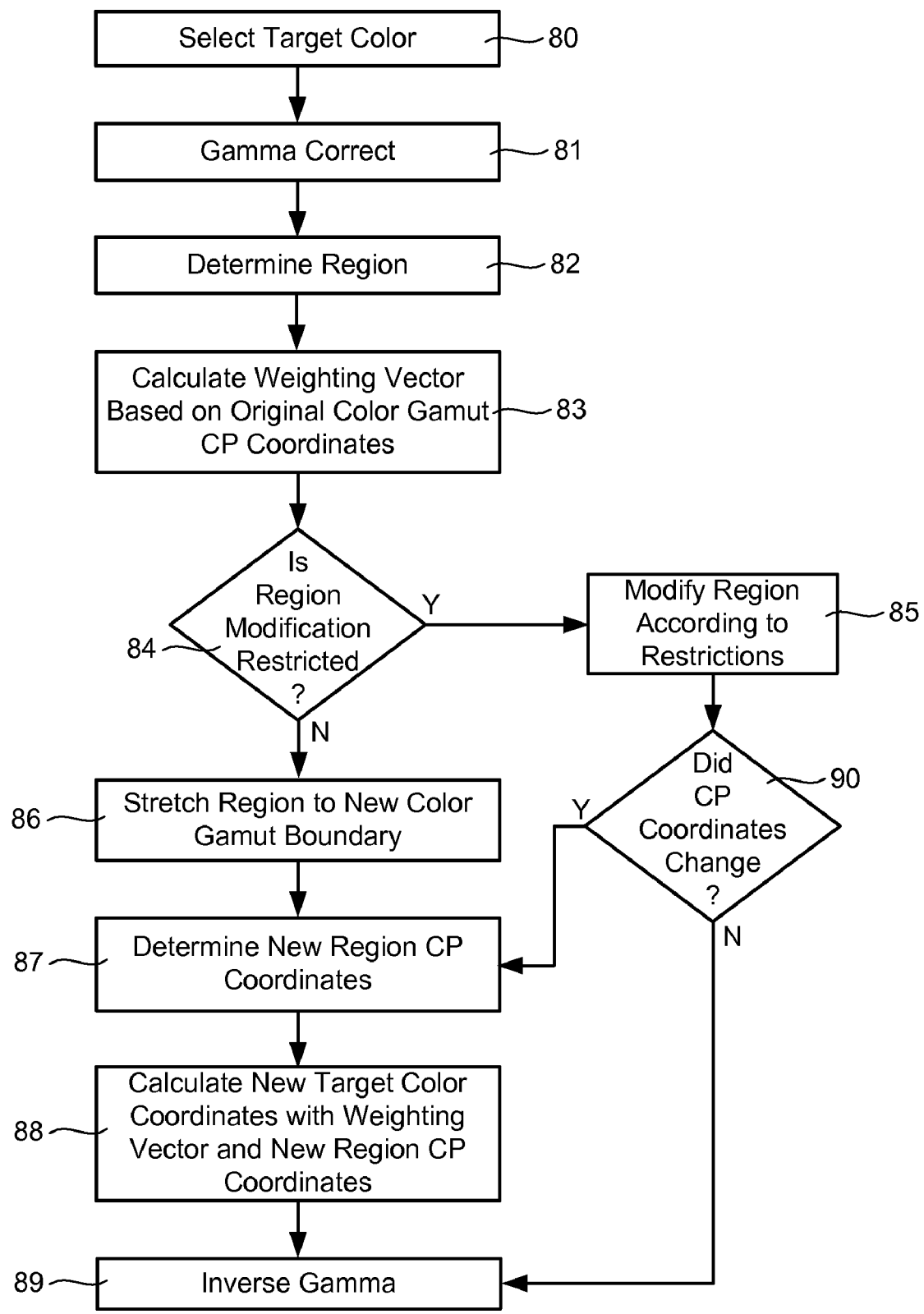
FIG. 5 is a diagram showing an exemplary method comprising optional region modification.

Some embodiments of the present invention may be described with reference to FIG. 5. In these embodiments, a target color may be selected 80 and the color's coordinates, in a first color gamut, may be gamma corrected 81. The color gamut region, in which the target color resides, may then be determined 82. A weighting vector may then be determined for the target color 83. This weighting vector may be based on the target color's coordinates and the coordinates of control points, which define the regions boundary.

A region may have modification restrictions. If the region in which the target color resides is found 84 to have modification restrictions, the region may only be modified 85 according to those restrictions. In some embodiments, these restrictions may prevent regional boundary changes and may prevent any changes to the region's control point coordinates. In other embodiments, limited control point coordinate changes may be allowed. If the region in which the target color resides does not have special restrictions 86, the region may be stretched to meet the boundary of a new color gamut 86. This process may result in new coordinates being assigned 87 to one or more control points of the region. New target color coordinates, corresponding to the new color gamut may then be calculated 88 using the weighting vectors and the coordinates of the new control points for the region. These new target color coordinates may then be inverse gamma corrected 89 to return to the code value domain.

Colors found to be in a region with special restrictions 85 may be modified according to those restrictions. If the modification results in control point coordinate changes for the region 90, the new coordinates may be determined 87 and new target color coordinates may be calculated 88 with the weighting vector and the new region control point coordinates. The new target color coordinates may then be inverse gamma corrected 89. When control point coordinates do not change, the target color coordinates will not require processing and may simply be inverse gamma corrected 89.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for adjusting image color values, said method comprising:
   a) dividing a first color gamut into a plurality of color regions, represented by polygons having vertices, wherein one or more of said color region polygons are at least partially bounded by a line defined by the constraint whereby a red value of a color equals a blue value of said color divided by a constant and a line defined by the constraint whereby a red value of a color equals a green value of said color divided by another constant, wherein neither constant equals one;
   b) defining control points at the vertices of said color regions;
   c) selecting a target color, wherein said target color is defined by first target coordinates related to said first color gamut;
   d) determining a first color region, in said plurality of color regions, where said target color is located;
   e) determining first color region control point coordinates for said control points corresponding to said first color region;
   f) determining a target color weighting vector using said first target coordinates and said first color region control point coordinates;
   g) converting said first color region control point coordinates to relate to a second color gamut thereby creating second-gamut control point coordinates; and
   h) calculating second-gamut target color coordinates related to said second color gamut by combining said target color weighting vector with said second-gamut control point coordinates.

2. A method as described in claim 1 further comprising identifying at least one of said color regions as a skin-color region and performing steps e) through h) only when said first color region is not said skin-color region.

3. A method as described in claim 1 further comprising identifying at least one of said color regions as a protected color region and performing steps e) through h) only when said first color region is not said protected color region.

4. A method as described in claim 1 wherein said converting said first color region control point coordinates to relate to a second color gamut thereby creating second-gamut control point coordinates comprises stretching the location of said first color region control points to accommodate an expanded color gamut boundary.

5. A method as described in claim 1 wherein a plurality of said first color region control points are located on a boundary of said first color gamut and wherein said converting said first color region control point coordinates to relate to a second color gamut thereby creating second-gamut control point coordinates comprises stretching the location of any of said first color region control points, which are located on the boundary of said first color gamut to accommodate an expanded color gamut boundary.

6. A method as described in claim 1 wherein said determining a target color weighting vector comprises multiplying the inverse of a matrix of said first color region control point coordinates with a vector of said first target coordinates.

7. A method as described in claim 1 wherein said calculating second-gamut target color coordinates comprises multiplying a matrix of second-gamut control point coordinates with said target color weighting vector.

8. A method for qualifying a color as a skin-color, said method comprising:
   a) dividing a red, green, blue (RGB) color gamut into color regions, wherein each of the following lines defines a boundary of at least one of said color regions:
      i) the boundary lines of the color gamut between the red point, the green point and the blue point;
      ii) a line defined by the constraint whereby a blue value of a color equals a red value of said color;
      iii) a line defined by the constraint whereby a blue value of a color equals a green value of said color;
      iv) a line defined by the constraint whereby a green value of a color equals a red value of said color;
      v) a line defined by the constraint whereby a red value of a color equals a blue value of said color divided by a constant, $k_3$ ($\neq 1$); and
      vi) a line defined by the constraint whereby a red value of a color equals a green value of said color divided by a constant, $k_2$ ($\neq 1$);
   b) designating at least one of said color regions as a skin-color region; and
   c) qualifying a target color as a skin-color if said target color's coordinates reside within said at least one skin-color region.

9. A method as described in claim 8 further wherein $k_3$ is equal to $k_2$.

10. A method as described in claim 8 further comprising qualifying a target color as a non-skin-color if said target color's coordinates reside outside said at least one skin-color region.

11. A method as described in claim 8 wherein at least one of said color regions is at least partially bounded by a line defined by the constraint whereby a red value of a color equals a blue value of said color divided by a constant, $k_1$ ($\neq 1$).

12. A method as described in claim 8 wherein $k_3$ is equal to $k_2$, which is equal to $k_1$.

13. A method as described in claim 8 wherein said skin-color region is bounded by said line defined by the constraint whereby a blue value of a color equals a green value of said color, said line defined by the constraint whereby a green value of a color equals a red value of said color, and said line defined by the constraint whereby a red value of a color equals a blue value of said color divided by a constant, $k_3$, wherein $k_3$ varies between 0 and 1.

14. A method as described in claim 8 wherein said skin-color region is bounded by said line defined by the constraint whereby a blue value of a color equals a green value of said color, said line defined by the constraint whereby a blue value of a color equals a red value of said color, and said line defined by the constraint whereby a red value of a color equals a green value of said color divided by a constant, $k_2$, wherein $k_2$ varies between 0 and 1.

15. A method as described in claim 8 wherein said skin-color region is bounded by said line defined by the constraint whereby a green value of a color equals a red value of said color, said line defined by the constraint whereby a red value of a color equals a blue value of said color divided by a constant, $k_3$ and said line defined by the constraint whereby a red value of a color equals a green value of said color divided by a constant, $k_2$, wherein $k_2$ and $k_3$ vary between 0 and 1.

16. A method as described in claim 15 wherein $k_2$ and $k_3$ are equal.

17. A method for preserving skin-color during a color gamut conversion, said method comprising:
   a) dividing a first red, green, blue (RGB) color gamut into color regions, wherein each of the following lines defines a boundary of at least one of said color regions:
      i) the boundary lines of the color gamut between the red point, the green point and the blue point;
      ii) a line defined by the constraint whereby a blue value of a color equals a red value of said color;
      iii) a line defined by the constraint whereby a blue value of a color equals a green value of said color;
      iv) a line defined by the constraint whereby a green value of a color equals a red value of said color;
      v) a line defined by the constraint whereby a red value of a color equals a blue value of said color divided by a constant, $k_1$ ($\neq 1$); and
      vi) a line defined by the constraint whereby a red value of a color equals a green value of said color divided by a constant, $k_2$ ($\neq 1$);
   b) designating at least one of said color regions as a skin-color region;
   c) qualifying a target color as a non-skin-color if said target color's first color gamut coordinates reside outside said at least one skin-color region
   d) if said target color does not reside in a skin-color region, designating control points at the vertices of said lines, said control points having control point coordinates;
   e) if said target color does not reside in a skin-color region, calculating a weighting vector for said target color, said weighting vector being based on said target color's first color gamut coordinates and the coordinates of control points on the boundary of said target color's region;
   f) if said target color does not reside in a skin-color region, modifying the boundaries of said target color's region to accommodate a second color gamut, thereby calculating second color gamut control point coordinates for said control points on the boundary of said target color's region; and
   g) if said target color does not reside in a skin-color region, calculating second color gamut coordinates for said target color using said weighting vector and said second color gamut control point coordinates.

18. A method as described in claim 17 further comprising:
   a) qualifying a target color as a skin-color if said target color's first color gamut coordinates reside within said at least one skin-color region; and
   b) maintaining the coordinates of said target color if said target color does reside in a skin-color region.

* * * * *